(12) United States Patent
Yamada et al.

(10) Patent No.: US 6,950,100 B2
(45) Date of Patent: Sep. 27, 2005

(54) MAP DISPLAY DEVICE, A MEMORY MEDIUM AND A MAP DISPLAY METHOD

(75) Inventors: Kunihiro Yamada, Okazaki (JP); Takanori Kaji, Okazaki (JP); Yumi Shibata, Okazaki (JP); Hiroyoshi Masuda, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 537 days.

(21) Appl. No.: 09/810,609

(22) Filed: Mar. 19, 2001

(65) Prior Publication Data

US 2001/0024203 A1 Sep. 27, 2001

(30) Foreign Application Priority Data

Mar. 21, 2000 (JP) ........................................ 2000-077880

(51) Int. Cl.[7] .............................................. G06T 17/00
(52) U.S. Cl. ....................... 345/428; 345/441; 345/581; 345/584; 345/589; 701/209; 701/212
(58) Field of Search ................................ 345/428, 441, 345/442, 443, 584, 589, 582; 701/209, 212

(56) References Cited

U.S. PATENT DOCUMENTS

| | | | | | |
|---|---|---|---|---|---|
| 5,204,817 | A | * | 4/1993 | Yoshida | 701/209 |
| 5,925,091 | A | * | 7/1999 | Ando | 701/212 |
| 6,587,787 | B1 | * | 7/2003 | Yokota | 701/212 |

* cited by examiner

Primary Examiner—Kimbinh T. Nguyen
(74) Attorney, Agent, or Firm—Oliff & Berridge, PLC

(57) ABSTRACT

A map display device using an input unit for inputting a display scale, a memory for storing polygon map data, a drawing processing control unit for drawing a polygon map by loading polygon map data from the memory and a display unit for displaying an output from the drawing processing control unit, wherein the drawing processing control unit is provided with a function for determining a unit of a polygon map that should be drawn and drawing a polygon map of the determined unit.

11 Claims, 13 Drawing Sheets

GUIDANCE ROAD DATA

| NUMBER (n) OF ROADS | |
|---|---|
| 1 | ROAD NUMBER |
| | LENGTH |
| | ROAD COORDINATE DATA |
| | SHAPE DATA ADDRESS / SIZE |
| | GUIDANCE DATA ADDRESS / SIZE |
| ⋮ | ⋮ |
| n | ROAD NUMBER |
| | ⋮ |
| | GUIDANCE DATA ADDRESS / SIZE |

Fig. 3A

SHAPE DATA

| NUMBER (m) OF NODES | |
|---|---|
| 1 | EAST LONGITUDE |
| | NORTH LATITUDE |
| ⋮ | ⋮ |
| m | EAST LONGITUDE |
| | NORTH LATITUDE |

Fig. 3B

GUIDANCE DATA

| NAME OF INTERSECTION |
|---|
| CAUTION DATA |
| ROAD NAME DATA |
| ROAD NAME VOICE DATA ADDRESS / SIZE |
| DESTINATION DATA ADDRESS / SIZE |

Fig. 3C

| NUMBER (m) OF AREAS | |
|---|---|
| 1 | CLASSIFICATION |
| | COLOR CODE |
| | ADDRESS CODE |
| | POINT (n) |
| | COORDINATE $(X_1, Y_1)$ |
| | COORDINATE $(X_2, Y_2)$ |
| | ⋮ |
| | COORDINATE $(X_n, Y_n)$ |
| ⋮ | ⋮ |
| m | · · · · · · · · · · · · · · |

EXAMPLE OF ADDRESS CODE

| DISTRICT | PREFECTURE | CITY / WARD / TOWN / VILLAGE | OAZA | KOAZA | CHOME | BANCHI | GOU |
|---|---|---|---|---|---|---|---|

|  | OAZA POLYGON | CITY / WARD / TOWN / VILLAGE POLYGON | PREFECTURE POLYGON |
|---|---|---|---|
| LEVEL 0 | ● | — | — |
| LEVEL 2 | ● | ● | — |
| LEVEL 4 | — | ● | — |
| LEVEL 6 | — | ● | ● |
| LEVEL 8 | — | — | ● |
| LEVEL 10 | — | — | ● |
| LEVEL 12 | — | — | — |

|  | | OAZA POLYGON | CITY / WARD / TOWN / VILLAGE POLYGON | PREFECTURE POLYGON |
|---|---|---|---|---|
| LEVEL 0 | 1/5,000 | ● | | |
| | 1/10,000 | ● | | |
| | 1/20,000 | ● | | |
| LEVEL 2 | 1/40,000 | ● | | |
| | 1/80,000 | | ● | |
| LEVEL 4 | 1/160,000 | | ● | |
| | 1/320,000 | | ● | |
| LEVEL 6 | 1/640,000 | | ● | |
| | 1/1,280,000 | | | ● |
| LEVEL 8 | 1/2,560,000 | | | ● |
| | 1/5,120,000 | | | ● |
| LEVEL 10 | 1/10,240,000 | | | ● |
| | 1/20,480,000 | | | ● |

Fig. 8

|  | CHOME POLYGON | KOAZA POLYGON | OAZA POLYGON | CITY POLYGON | PREFECTURE POLYGON | DISTRICT POLYGON | SPARE |
|---|---|---|---|---|---|---|---|
| LEVEL 0 | ● |  |  |  |  |  |  |
| LEVEL 2 |  | ● |  |  |  |  |  |
| LEVEL 4 |  |  | ● |  |  |  |  |
| LEVEL 6 |  |  |  | ● |  |  |  |
| LEVEL 8 |  |  |  |  | ● |  |  |
| LEVEL 10 |  |  |  |  |  | ● |  |
| LEVEL 12 |  |  |  |  |  |  | — |

Fig. 16

|  |  | CHOME POLYGON | KOAZA POLYGON | OAZA POLYGON | CITY POLYGON | PREFECTURE POLYGON | DISTRICT POLYGON |
|---|---|---|---|---|---|---|---|
| LEVEL 0 | 1/5,000 | ● |  |  |  |  |  |
|  | 1/10,000 | ● |  |  |  |  |  |
|  | 1/20,000 | ● |  |  |  |  |  |
| LEVEL 2 | 1/40,000 |  | ● |  |  |  |  |
|  | 1/80,000 |  | ● |  |  |  |  |
| LEVEL 4 | 1/160,000 |  |  | ● |  |  |  |
|  | 1/320,000 |  |  | ● |  |  |  |
| LEVEL 6 | 1/640,000 |  |  |  | ● |  |  |
|  | 1/1,280,000 |  |  |  | ● |  |  |
| LEVEL 8 | 1/2,560,000 |  |  |  |  | ● |  |
|  | 1/5,120,000 |  |  |  |  | ● |  |
| LEVEL 10 | 1/10,240,000 |  |  |  |  |  | ● |
|  | 1/20,480,000 |  |  |  |  |  | ● |

Fig. 17

MAP DISPLAY DEVICE, A MEMORY MEDIUM AND A MAP DISPLAY METHOD

BACKGROUND OF THE INVENTION

1. Field of Invention

The invention relates to a map display system for drawing a polygon map by determining a unit of a polygon map to be displayed in the background of a road map, and a memory medium.

2. Description of Related Art

In prior map displays for a navigation system, polygon maps showing boundaries of administrative divisions have been displayed in the background of a road map. Since data for these polygon maps have a predetermined administrative division unit and associated color stored, when a map is displayed on any scale, polygon maps are displayed in the same unit and color. Therefore, for example, in a large area map with boundaries for the administrative divisions of Japan (other countries having different administrative divisions), the prefectures for Tokyo, Hokkaido, Osaka, and Kyoto are displayed. However, when a detailed map is displayed without showing the boundaries of the administrative divisions, the background color of the road map is displayed in the same unified color for all the scales.

If polygon map data is stored on the basis of a small administrative division (such as "Oaza"—a large section of village), the unit of the polygon map is too small and the entire map becomes difficult to view when a large area map is displayed. On the other hand, if polygon map data is stored on the basis of a large unit (such as Prefecture), a screen is filled with one unified color and the boundaries of the administrative divisions are not displayed when a detailed map is displayed. Thus, information on a vehicle present position is difficult to read from the map information. It is also difficult to distinguish between boundaries and road information because if the boundaries of administrative divisions are simply displayed with lines, the boundaries can be mistaken for roads.

SUMMARY OF THE INVENTION

The invention thus provides a map display that is easy to understand to prevent boundaries of administrative divisions from being mistaken for roads on any scale.

In various exemplary aspects of a map display system according to the invention the map display device comprises input means for inputting a display scale, memory means for storing polygon map data, drawing processing control means for drawing a polygon map by reading the polygon map data from the memory means and display means for displaying an output from the drawing processing control means, wherein the drawing processing control means draws a display condition of each polygon differently from others.

In various exemplary aspects of a memory medium according to the invention, the memory medium stores therein a polygon map database in which information showing display conditions of polygons are set up and a program for drawing a display condition of each polygon differently from others is output.

BRIEF DESCRIPTION OF THE DRAWINGS

Various exemplary embodiments of the invention will be described in detail, with reference to the following figures, wherein:

FIGS. 3A–3C show an example of a road map data file structure;

FIG. 8 is a diagram describing a polygon map data use table;

FIG. 16 shows another example of a polygon map data storage table;

FIG. 17 shows another example of a polygon map data use table;

DETAILED DESCRIPTION OF PREFERRED EMBODIMENTS

Figure 1:
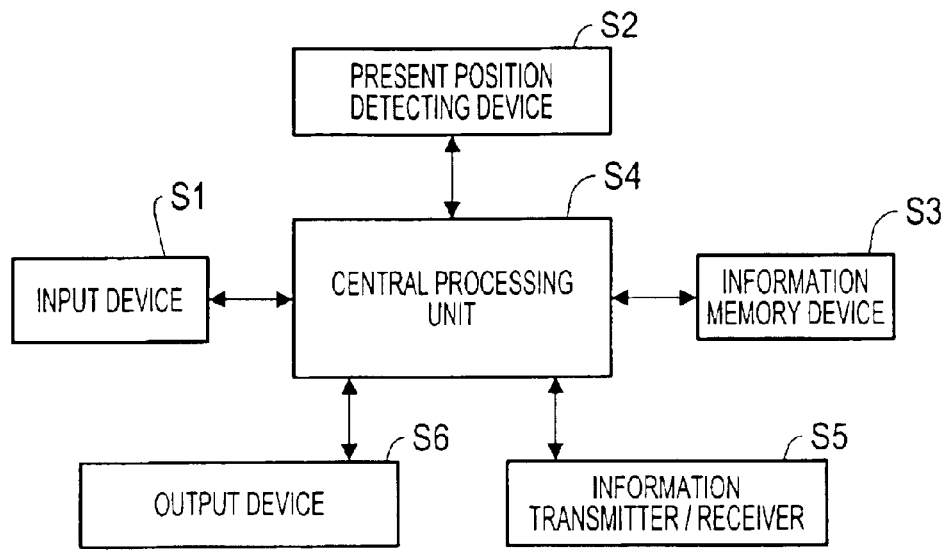
FIG. 1 shows an example of a composition of a navigation system according to the invention.

The following are exemplary embodiments of the invention, which will be described with reference to the drawings. FIG. 1 is a diagram showing an example of a composition of a navigation system to which a map display device according to the invention is applied. It is composed of an input device 1 for inputting information on route guidance, a present position detecting device 2 for detecting information on a vehicle present position, information memory device 3 for storing therein navigation data as required for calculation of routes, display/audio guidance data as necessary for route guidance, programs (application and/or OS) and the like, a central processing unit 4 for performing route search processing, data production as required for route guidance, display/voice guidance processing as required for route guidance and further the entire system control, an information transmitter/receiver 5 for transmitting and receiving road information on the vehicle, for example, road information or traffic information and for detecting information on the vehicle present position and further transmitting and receiving information on the vehicle present position and an output device 6 for outputting information on route guidance.

The input device 1 is provided with functions for inputting a destination and instructing the central processing unit 4 to execute the navigation processing in conformity with a driver's intention. As the means for performing these functions, a remote controller and the like, such as a touch switch or a jog dial and the like, for inputting a destination in the form of a telephone number or a point of coordinates on a map etc., and for requesting route guidance can be used. Further, the invention is provided with a device for performing an interaction by voice input, which functions as a voice input device. There may also be added a record card reader for reading data recorded in an IC card or a magnetic card. Furthermore, there may be added a data communication device for data communications between information sources, such as an information center, for accumulating therein data necessary for navigation and providing information via communication links upon the driver's request, and a portable style electronic device storing therein map data, destination data, data of a simple frame map, a building shaped map or the like.

The present position detecting device 2 includes a GPS receiver for calculating the vehicle present position, a traveling speed or an absolute direction by using the Global Positioning System (GPS), a beacon receiver for receiving information such as vehicle present position information, lane information and the like, a data receiver for receiving a corrective signal of the GPS by using a cellular telephone (a car telephone) or a FM multiplex signal, an absolute direction sensor for detecting the travel direction of the vehicle with an absolute direction by using, for example, a geomagnetic, a relative direction sensor for detecting the travel direction of the vehicle by using, for example, a steering sensor and a gyro sensor, a distance sensor for detecting the travel distance, for example, from a number of revolutions of a wheel and the like.

The information memory device 3 is a storage device in which programs and data for navigation are stored. For example, the information memory device 3 may comprise an external memory medium, such as a CD-ROM, a DVD-ROM, a floppy disc, and a memory card etc. It may also be comprised of an internal storage device, such as a ROM, a flash memory in the system unit etc. The stored programs therein include a program for performing processing, such as a route search etc., a program for performing guidance in an interactive manner by a voice input, a program for performing display/voice output control necessary for route guidance, a program for searching a point or a facility and the like. The data stored therein are comprised of files, such as road map data, polygon map data, search data, map matching data, destination data, register point data, image data of junction points, such as an intersection etc., genre data and the like, in which all the data necessary for navigation are stored. In addition, the invention can be applied to a kind of system in which the CD-ROM only stores the data and the central processing unit stores the programs, or the data and the programs are obtained from outside by a communication device.

The central processing unit 4 includes a CPU for performing various calculation processing, a flash memory for reading and storing the programs from the CD-ROM of the information memory device 3, a ROM in which a program (or program reading means) for checking and updating the programs contained in the flash memory; a RAM for temporarily storing the searched route guidance information, such as a point of coordinates of the determined destination, a road name code number and the like, or data under the calculation processing. Although the figures are omitted, the central processing unit further provides a voice processor for performing communication processing by a voice input from the input device 1, for synthesizing a voice, a phase, one sentence, a sound and the like read from the information memory device 3 on the basis of the voice output control signals from the CPU and transforming them into analog signals and outputting to a speaker, a communication interface for transferring the input/output data, a sensor input interface for receiving a sensor signal of the present position detecting device 2, for determining a present position and for determining a cursor position on a screen, and a clock for writing the date and time in internal diagnosis information. In addition, programs for performing the updating processing may be stored in an external memory device.

The programs according to the invention and the other programs for executing navigation may be wholly stored in a CD-ROM as an external memory medium, or they may be partially or wholly stored in the ROM. The data and programs as stored in the external memory medium, are input as external signals to the central processing unit of the navigation system and processed by calculation so that various navigation functions are realized.

As described above, the navigation system according to the invention embeds therein the flash memory having a relatively large capacity for reading programs from the CD-ROM of the external memory device and the ROM having a small capacity that stores a program (or program reading means) for performing an initiation processing of the CD. The flash memory is a non-volatile memory for maintaining the stored information even if the power is turned off. To perform initiation processing of the CD, the program stored in the ROM or a program reader is initiated to check the programs stored in the flash memory and load the disc managing information etc. stored in the CD-ROM of the information memory device 3. The loading processing (or updating processing) of the programs is performed by the judgment on this information and the state of the flash memory.

The information transmitter/receiver 5 comprises a GPS receiver for obtaining information by making use of the satellite navigation system (GPS), a VICS information receiver for obtaining information by making use of FM multi-channels, electric beacons, light beacons etc. A data transmitter/receiver is exemplified by a cellular telephone, a personal computer, etc. for exchanging the information with an information center (e.g., ATIS) or other vehicles, and the like.

The output device 6 is provided with functions for outputting voice/display guidance information as required by the driver and for outputting the navigation data processed in the CPU 4 to the printer. As means for performing these functions, the output device 6 comprises a display for displaying input data on a screen or for displaying a route guidance screen, a printer for printing out data processed in the CPU 4 or data stored in the information memory device 3, a speaker for vocally outputting route guidance, and the like.

The display includes a color CRT or liquid-crystal display device etc., and displays screens showing a polygon map screen processed in the CPU 4, a road map screen, an intersection enlarged screen, arrows for showing destination names, time, distances, travel directions, and the like. Since image data to be transmitted to the display is bitmap data, they can also be transmitted through a communication line used for a serial communication etc., or through the sharing of other communication lines, not through the exclusive image signal line. Further, the display may be equipped with a memory for temporarily storing the bitmap data.

The display is mounted inside the instrument panel in the vicinity of the driver's seat. Observing the interval screen enables the driver to ascertain the present position of the vehicle and to obtain information on a next route to follow. Moreover, the display may be composed with points or roads etc. (not shown) which can be input by touching or tracing the screen which making use of a tablet including a touch panel, a touch screen etc. on the display screen.

Figure 2:
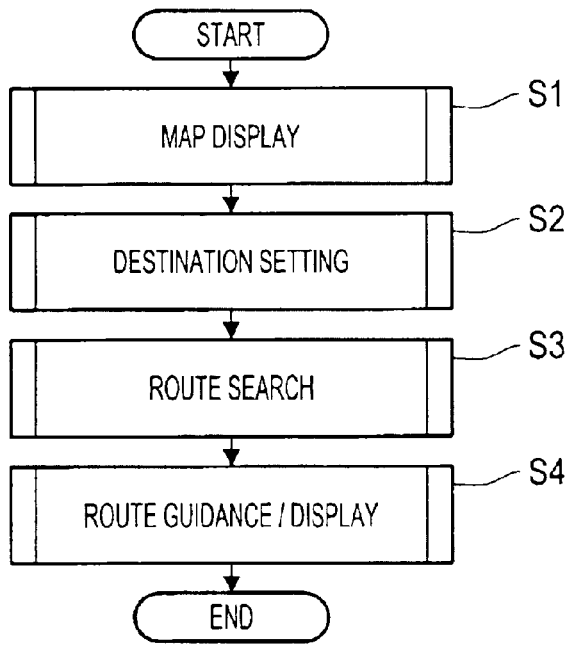
FIG. 2 is a flowchart describing the entire system.

FIG. 2 is a flowchart describing the entire system.

As a program for route guidance is started the program is loaded from the information memory device 3 to the central processing unit 4, a present position is detected by the present position detecting device 2 and a name of the present position as well as a vicinity map with the present position being located at its center is displayed S1. Next, a destination is set by using a destination name such as a place name, a facility name or the like, a telephone number, an address, a register point, a road name or the like S2. A route from the present position to the destination is then searched S3. As the route is determined, route guidance/display are repeatedly performed until the vehicle reaches the destination while tracing the present position by the present position detecting device 2 S4. If a stop on the way is set by input before reaching the destination, a new searching area based on the stop is set and a route search is performed again within the set searching area, and the route guidance is repeatedly performed until the vehicle reaches the destination in the same way as previously mentioned.

FIGS. 3A–3C show an example of road map data file structure stored in the information memory device 3 according to the invention shown in FIG. 1. FIG. 3A shows a part of the road map data file, in which each of the roads (n) has data for road number data, length data, road coordinate data, shape data address/size and guidance data address/size. The road number data has road numbers independently set for each direction (approaching path and return path) of a road between branch points. The road coordinate data as road guidance supplement information data is composed of data indicative of the road whether it is an elevated road, a road next to the elevated road, a subway or a road next to the subway, information on the number of lanes in the road, branch point data (a flag showing whether the road has branch point) and ramp data (a flag showing whether the road is a ramp). The shape data has coordinate data composed of east longitude and north latitude with respect to each of the number of nodes (m) when each road is divided by a plurality of nodes (sections), as shown in FIG. 3B. The guidance data is composed of each data of intersection (or branch point) name data, caution data, road name data, road name voice data address/size and destination data address/size, as shown in FIG. 3C. Further, apart from these data, textual data or landmark data to be displayed on a screen may be included as road map data.

The following data structure will be described for Japan. However, as should be appreciated, other countries would have a similar data structure.

Figures 4A, 4B, 4C:
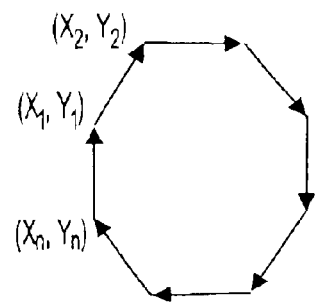
FIGS. 4A–4C show a set of diagrams describing a data structure of a polygon map.

FIGS. 4A–4C show diagrams describing a data structure of a polygon map stored in the information memory device 3 according to the invention as shown in FIG. 1. The polygon map data is map data showing a boundary of an area (usually, administrative division) such as the whole of Japan, the eastern district of Japan, the western district of Japan, the Tohoku district of Japan, the Kansai district of Japan, the prefecture, the city/ward/town/village or the like. The polygon map data also includes as shown in FIGS. 4A–4C, a classification showing unit information on an administrative division such as a prefecture (including Tokyo, Hokkaido, Osaka or Kyoto), or a city/a ward/a town/a village (a municipality) and display level information, a color code for displaying an administrative division on a map, an address code, attribute data such as the number of points of coordinates showing a closed area, and coordinate sequence data for showing a boundary of the closed area, stored in the information memory device with road map data. Further, the polygon data is classified and stored on the basis of each display level.

In this exemplary embodiment, polygons are distinguished and displayed by 5 colors. Information memory means stores therein a color table showing color codes which correspond to these 5 colors and a color is displayed by referring to this table. Further, brightness information, design information or the like may be stored. In this case, a brightness table or a design table is stored and a polygon to be displayed is shown, its brightness or design being different on the basis of each area.

A structure of the coordinate data is constructed as data of a vector sequence connecting between a starting point and an end point, and a boundary of the closed area is formed by connecting each vector, as shown in FIG. 4B. The address code shows an address to which the polygon belongs. For example, it includes a district (Tokai district, Hokuriku district, Kinki district, Kanto district etc.), a prefecture, a city, a ward, a town, a village, Oaza (a large section of village), Koaza (a small section of village), Chome, Banchi (a lot number) and Go (a number), as shown in FIG. 4C. A map drawn by this polygon data (a polygon map) shows only a boundary of the area where the amount of used data is small. Therefore, data processing for drawing a map is easily executed. Further, administrative areas are distinguished and displayed by colors, in any scale so that boundaries of the administrative areas are easy to understand and the vehicle present position is read out promptly when the polygon map is drawn as a background image. In this exemplary embodiment, a unit of a displayed polygon map and a color of each polygon map area automatically changes when given an instruction for changing a scale. Further, when the present position is moved, a new polygon map, including the present position, is displayed in the same unit as the previous polygon map and a color of a polygon map, including the present position, is displayed in a color different from the adjacent polygon maps. The present position is a vehicle present position detected by the present position detecting device or a scroll datum position of a map scroll input by the input device such as a remote controller or the like.

Figure 5:
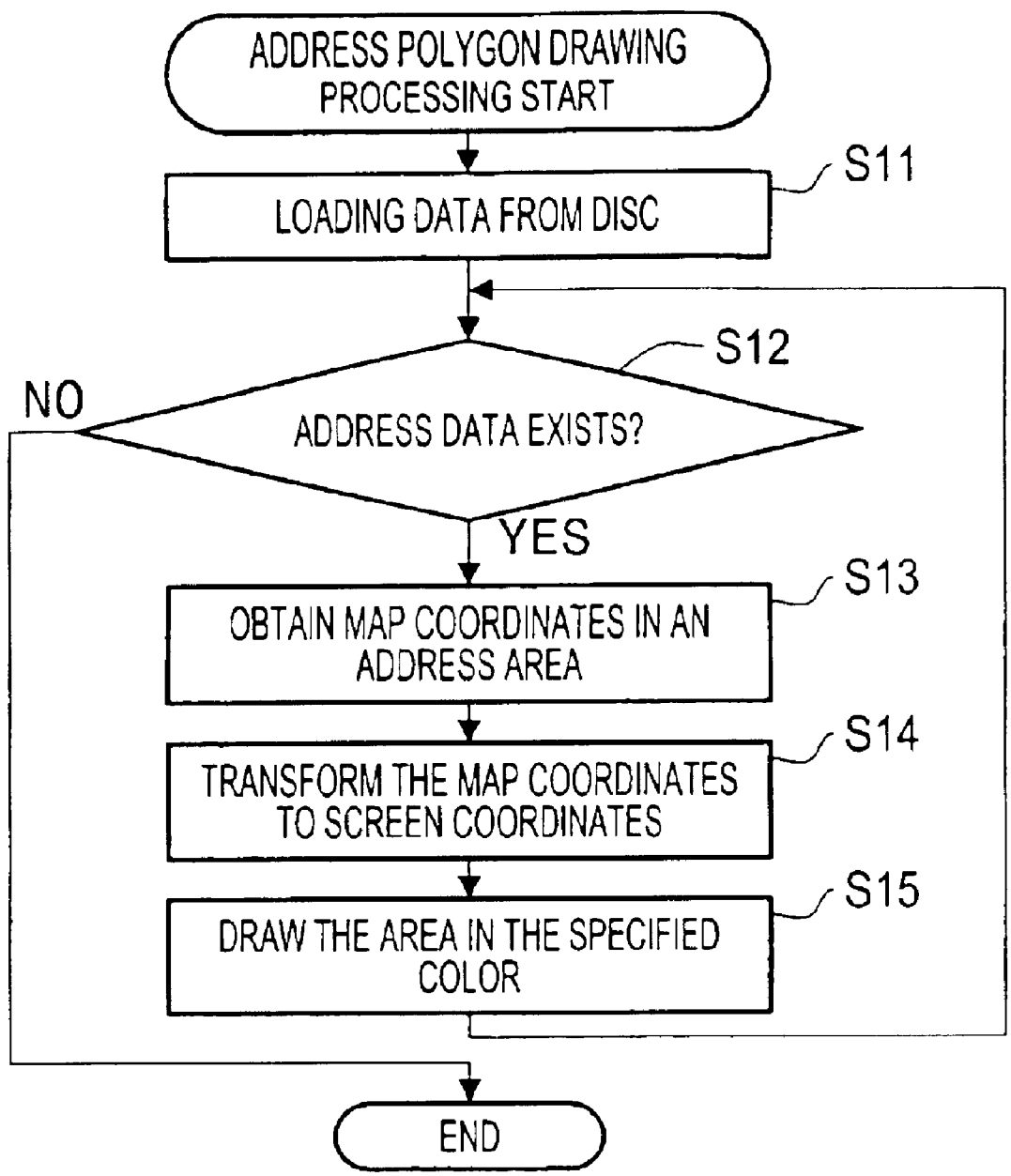
FIG. 5 is a flowchart describing address polygon drawing processing.
Figures 6, 7:
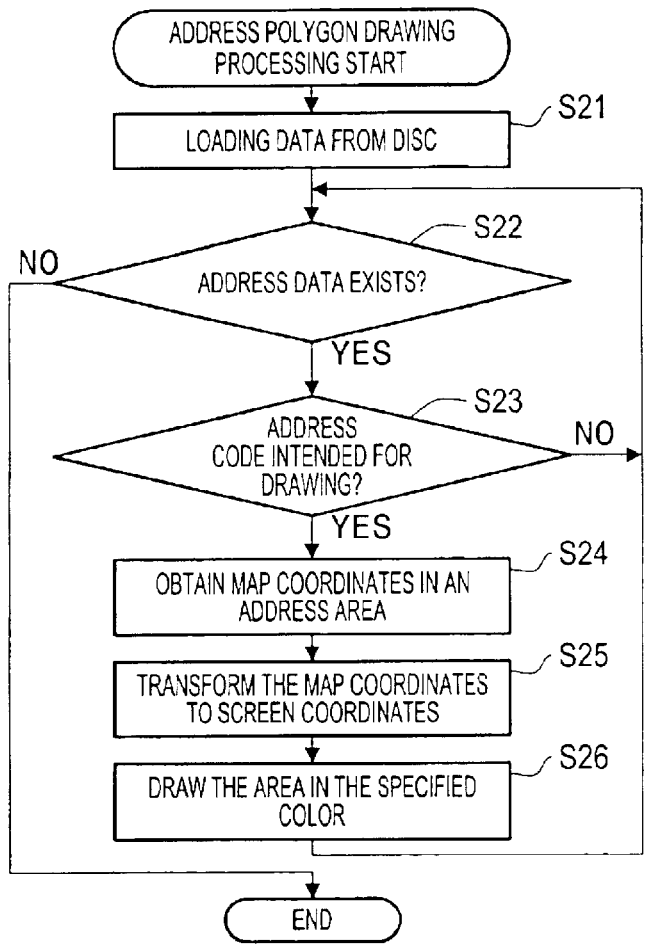
FIG. 6 is a flowchart describing specified address polygon drawing processing.
FIG. 7 is a diagram describing a polygon map data storage table.

FIGS. 5 and 6 are flowcharts describing a flow processing for drawing a map (the background of road map), where an address area is shown by using the polygon map data of FIGS. 4A–4C. FIG. 5 is a flowchart for address polygon drawing processing. This processing is executed when a map is displayed on a screen of the navigation system. The process can also be executed every time the scale change is instructed by operating a detail button and a large area button for changing the scale of the displayed map, in which drawing processing is automatically executed by reading data of all the polygon maps in the predetermined range of area including the range of the display. The polygon map data, in the predetermined range of area including the range of display, is first loaded from a disc S11. It is then judged whether address data is available S12. If address data is available (S12:YES), map coordinates (a sequence of coordinates) corresponding thereto S13 are obtained, the map coordinates are transformed to screen coordinates S14, and an area is drawn in a specified drawing color by referring to the color table corresponding to color codes S15. The processing thereafter returns to S12. However, if address data is not available (S12:NO), the processing is completed.

FIG. 6 is a flowchart describing drawing processing of a specified address polygon. This processing is executed when a cursor specifying a position on a screen is stopped, the position is input as a point and a map around that point is displayed, or it is executed each time a present position mark blinks (a cycle of matching between the moving track and the map), i.e., the drawing processing executed every time the present position is moved.

Data of a predetermined range, including a range of display, is first loaded from a disc S21. It is then judged whether address data is available S22. If address data is available (S22:YES), it is then judged whether the address data is an address code intended for drawing S23. If the address code is not intended for drawing (S23:NO), the processing returns to S22. If the address code is intended for drawing (S23:YES), map coordinates (coordinate sequence) of an address area corresponding to it is obtained S24, map coordinates are transformed to screen coordinates S25, and the area is drawn in a drawing color specified as attribute data S26. The processing thereafter returns to S22. However, if address data is not available (S22:NO), the processing is completed.

FIGS. 7 and 8 show examples of an address polygon database used in the invention. The data is in the information memory device with the polygon map data shown in FIG. 4. The following address polygon database will be described for Japan. However, as should be appreciated, other countries would have a similar database.

FIG. 7 shows an example of a polygon map data storing table, in which levels 0 to 12 correspond to the amount of map information to be displayed (the number of points of polygon coordinates), the number becoming smaller as the level becomes higher. This order is used because the handling of data of a large range causes an increase of the amount of data in a large area map where the level is high, thus, increasing the time required for drawing. In this exemplary embodiment, the information memory device stores therein data of Levels 0 and 2 for Oaza polygon, Levels 2, 4, and 6 for City/Ward/Town/Village polygon and Levels 6, 8, and 10 for Prefecture polygon. Namely, a plurality of polygon map data having the different amount of data for each polygon unit is stored. Levels 2 and 6 respectively corresponding to two polygon units where the same amount of data is stored even if the polygon units are different. Therefore, a unit which is clearly viewed is selected according to the display scale. Further, there is no polygon provided in Level 12. However, this is a spare level provided for a bigger unit such as a district polygon, a polygon of the whole of Japan, a polygon for overseas use or the like. The polygon map data may be stored on the basis of each scale instead of each level described above.

FIG. 8 shows a polygon map data use table, for Japan (other countries would have a similar table) in which the rate of scale and a polygon unit corresponding thereto are provided for each level. In this example, Oaza polygons of 1/5,000, 1/10,000 and 1/20,000 in Level 0, Oaza polygon of 1/40,000 and City/Ward/Town/Village polygon of 1/80,000 in Level 2, City/Ward/Town/Village polygons of 1/160,000 and 1/320,000 in Level 4, City/Ward/Town/Village polygon of 1/640,000 and Prefecture polygon of 1/1,280,000 in Level 6, Prefecture polygons of 1/2,560,000 and 1/5,120,000 in Level 8, and Prefecture polygons of 1/10,240,000 and 1/20,480,000 in Level 10 are respectively provided. Each data in the same level has the same amount of data stored even if the scales thereof are different. However, the amount of data displayed is bigger in a large area map thus requiring more time to draw a large area. Therefore, the amount of data should be reduced as the level becomes higher to prevent the speed of drawing from slowing down.

Figure 9:
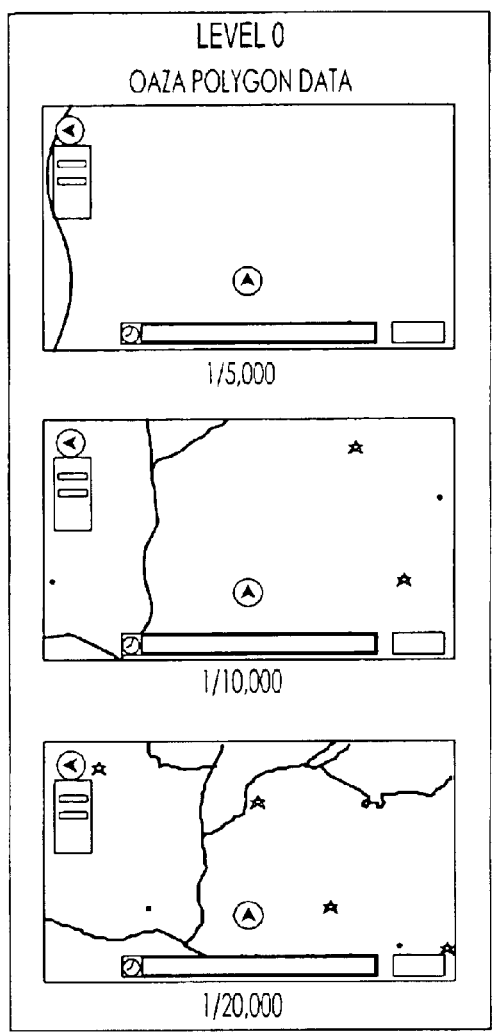
FIG. 9 shows road maps of which backgrounds are drawn with Oaza polygon maps of 1/5,000, 1/10,000 and 1/20,000.
Figure 10:
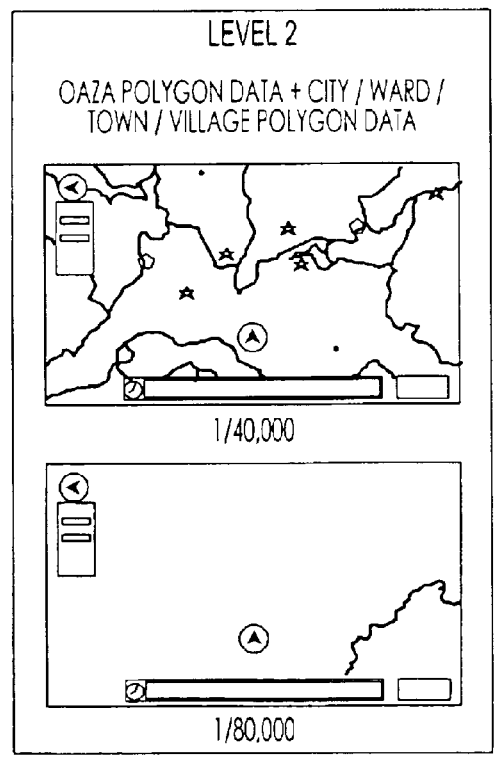
FIG. 10 shows road maps of which backgrounds are drawn with Oaza polygon map of 1/40,000 and City/Ward/Town/Village polygon of 1/80,000.
Figure 11:
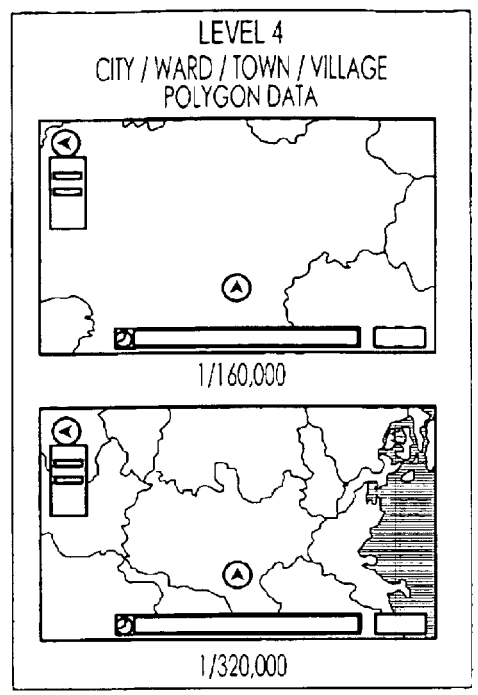
FIG. 11 shows road maps of which background are drawn with City/Ward/Town/Village polygon maps of 1/160,000 and 1/320,000.
Figure 12:
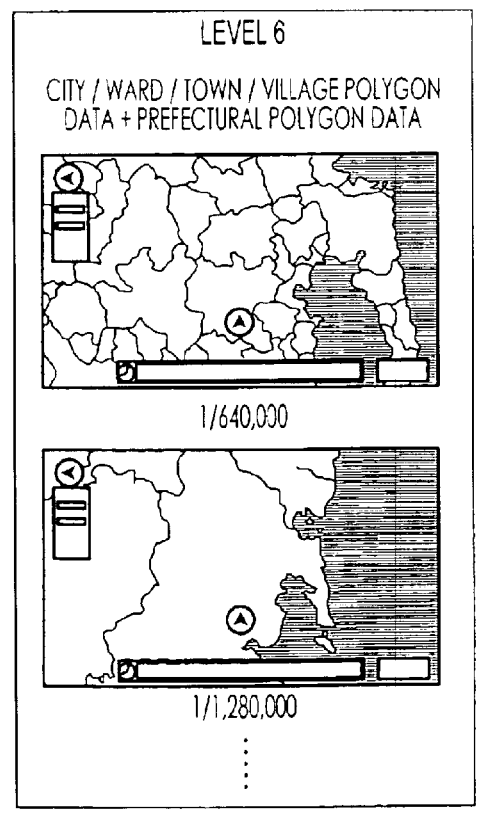
FIG. 12 shows road maps of which background are drawn with City/Ward/Town/Village polygon map of 1/640,000 and Prefecture polygon map of 1/1,280,000.

In the first exemplary embodiment according to the invention, as the user gives an instruction to perform a scale change, the polygon unit and the drawing level are determined by referring to the polygon map data table, reading the determined polygon map data out, and drawing a map. FIG. 9 shows road maps, of which the backgrounds are drawn with Oaza polygon maps of 1/5,000, 1/10,000 and 1/20,000 in Level 0, FIG. 10 shows road maps, of which the backgrounds are drawn with Oaza polygon map of 1/40,000 and City/Ward/Town/Village polygon of 1/80,000 in Level 2, FIG. 11 shows road maps of which the backgrounds are drawn with City/Ward/Town/Village polygon maps of 1/160,000 and 1/320,000 in Level 4, and FIG. 12 shows road maps of which the backgrounds are drawn with City/Ward/Town/Village polygon map of 1/640,000 and Prefecture polygon map of 1/1,280,000 in Level 6, wherein polygon maps are respectively distinguished in colors for respective levels. Further, if the Oaza polygon of 1/40,000 is too small in Level 2, a map is drawn with the City/Ward/Town/Village polygon of 1/80,000. On the other hand, if the City/Ward/Town/Village polygon of 1/80,000 is too rough, a map can be drawn with the Oaza polygon of 1/40,000. In the same manner, if the City/Ward/Town/Village polygon of 1/640,000 is too small, a map is drawn with the Prefecture polygon of 1/1,280,000. On the other hand, if the Prefecture polygon of 1/1,280,000 is too rough, a map can be drawn with the City/Ward/Town/Village polygon of 1/640,000.

Figure 13:
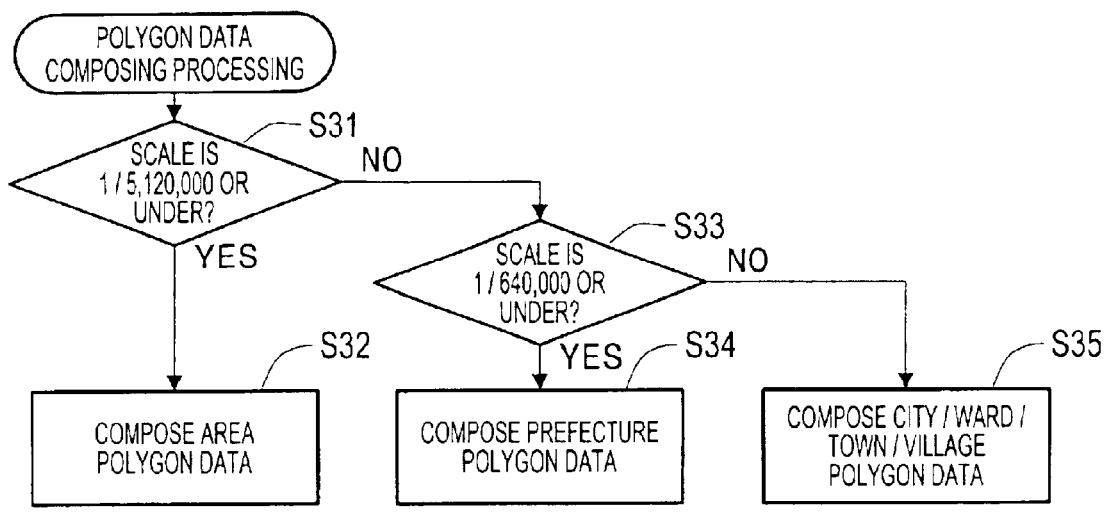
FIG. 13 is a flowchart showing polygon map composing processing.
Figure 14:
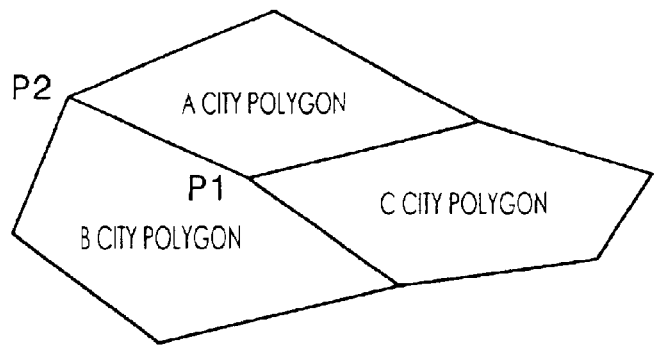
FIG. 14 is a diagram showing a prefecture polygon produced from City/Ward/Town/Village polygons.

Next, FIGS. 13 to 15 describe the second exemplary embodiment in which only one type of polygon map data is stored. This exemplary embodiment will be for Japan. However, other countries would have similar map data. In the second exemplary embodiment, the polygon map data has only one small unit polygon data stored with larger polygon map data units made from the smallest unit polygon data. When the user inputs an instruction for a scale change, a polygon map unit (Prefecture, City/Ward/Town/Village, Oaza etc.) corresponding to the input scale is determined from the polygon map data use table (FIG. 8), showing a correspondence between a scale and a polygon data map, and the polygon map data is drawn.

FIG. 13 is a flowchart showing polygon map data processing of the present exemplary embodiment. In this example, Oaza polygon is stored as the smallest unit of the polygon map data. It is then judged whether the scale rate instructed at a scale change by the user is 1/5,120,000 and under S31. If the scale rate is a large area map of 1/5,120,000 and under (S31:YES), area polygon map data is made composing from the Oaza polygon S32. If the scale rate is more than 1/5,120,000 (S31:NO), the scale rate is judged to determine scale rate is 1/640,000 and under S33. If the scale rate is 1/640,000 and under, (S33:YES) prefecture polygon map data is made by composing from the Oaza polygon S34. However, if the scale rate is more than 1/640,000 (S33:NO), City/Ward/Town/Village polygon map data is made by composing from the Oaza polygon.

Since the polygon map data has information on each address comprising Prefecture, City/Town/Village, Oaza, Koaza, Chome, Banchi, and Gou, all the polygon map data, storing therein an address code determined in response to the input scale (ex. Prefecture unit) is read out, and coordinate sequences thereof are respectively compared. For example, as shown in FIG. 14, when a prefecture polygon map is made from polygon maps for A city, B city and C city, if two successive points for a city, for example, of coordinates (P1, P2) comprising a part of the polygon map data match with polygon map data of B city, a common line connects these successive points of coordinates. Thus, this coordinate data is omitted. This processing is executed on each polygon map, as the remaining points of coordinates are connected, boundaries coming in contact each other are removed and polygon map data based on the prefecture unit is composed.

Figure 15A:
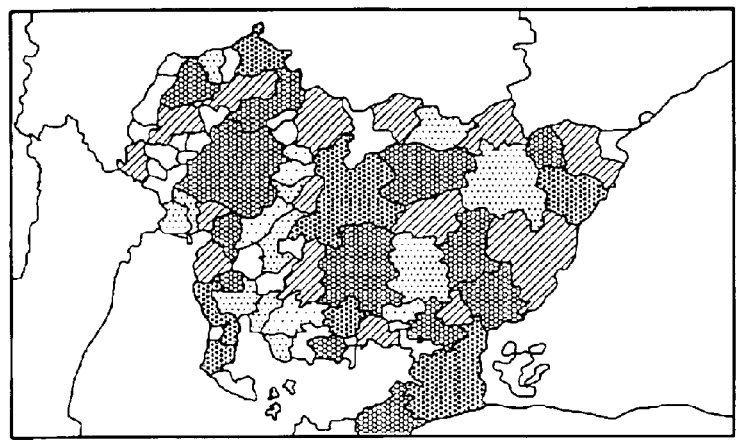
FIGS. 15A–15C are diagrams showing a prefecture polygon and a district polygon respectively composed of city/ward/town/village polygons.
Figure 15B:
Figure 15C:

FIGS. 15A–15C show polygon maps in which FIG. 15A is a map of city/ward/town/village polygons, FIG. 5B is a map of prefectural polygons and FIG. 15C is a map of district polygons. Further, with regard to color information in this exemplary embodiment, an optional method in which a color code is assigned in order of the compositions, in order of the size of polygons or the like, may be applied.

Further, in the above first exemplary embodiment, even polygon map data on one unit has a plurality of levels stored in the information memory (for example, polygon map data of Oaza has two data of levels 0 and 2). However, if such a composition is applied, the amount of data is increased thus requiring a large storage capacity. Therefore, the third exemplary embodiment for minimizing the storage capacity is described.

In the present exemplary embodiment, the information memory has one polygon map data (one level only) stored therein (for Japan, other countries would have a similar data structure) on the basis of one classification of the districts (the Tokai district, the Tohoku district, the Kinki district, Kanto district etc.), prefectures (Aichi, Gifu, Mie etc.), cities/wards/towns/villages (Nagoya, Toyota, Kariya, Anjo etc.), Oaza, Koaza, Chome, Banchi, Gou or the like. For example, a corresponding table between levels showing the number of points of polygon coordinates and polygon units, shown in FIG. 16, and a corresponding table between scales and polygon units, shown in FIG. 17, is also stored. Since only one level is corresponds to each polygon unit in FIGS. 16 and 17, the amount of polygon map data to be stored is smaller compared to FIGS. 8 and 9. If a map of a certain scale is displayed, polygon map data corresponding to the scale is determined by referring to the corresponding polygon data table. For example, when the scale is 1/10,000, a map is drawn by using data of Chome-polygon and when it is 1/160,000, a map is drawn by using data of Oaza polygon. Since polygon data has color information, brightness information, design information and the like are stored therein to be distinguished from other adjoining polygon data. Thus adjoining polygons are not drawn as if they were mixed with each other.

As above, polygon map drawing processing according to the invention is described on the basis of the above exemplary embodiments, however, the invention is not limited to the above exemplary embodiments. For example, in the above exemplary embodiments, processing for drawing a polygon map by using all the polygon map data included in the range of the drawing is described. However, a polygon map may be displayed by determining a present position (a vehicle present position or a cursor present position) and using only the polygon map data in which the determined present position is included (polygon data in which the preset position is included is only loaded at S11 shown in FIG. 5). By applying this method, for example, if it is unknown which prefecture (country) a cursor present position is located, a range to which the cursor position belongs is clearly drawn. Further, if the speed of the cursor transfer is high, a polygon map drawn in conjunction with the cursor transfer is performed, without delay, so that the user can easily recognize a location of a point and input the point.

Figure 18:
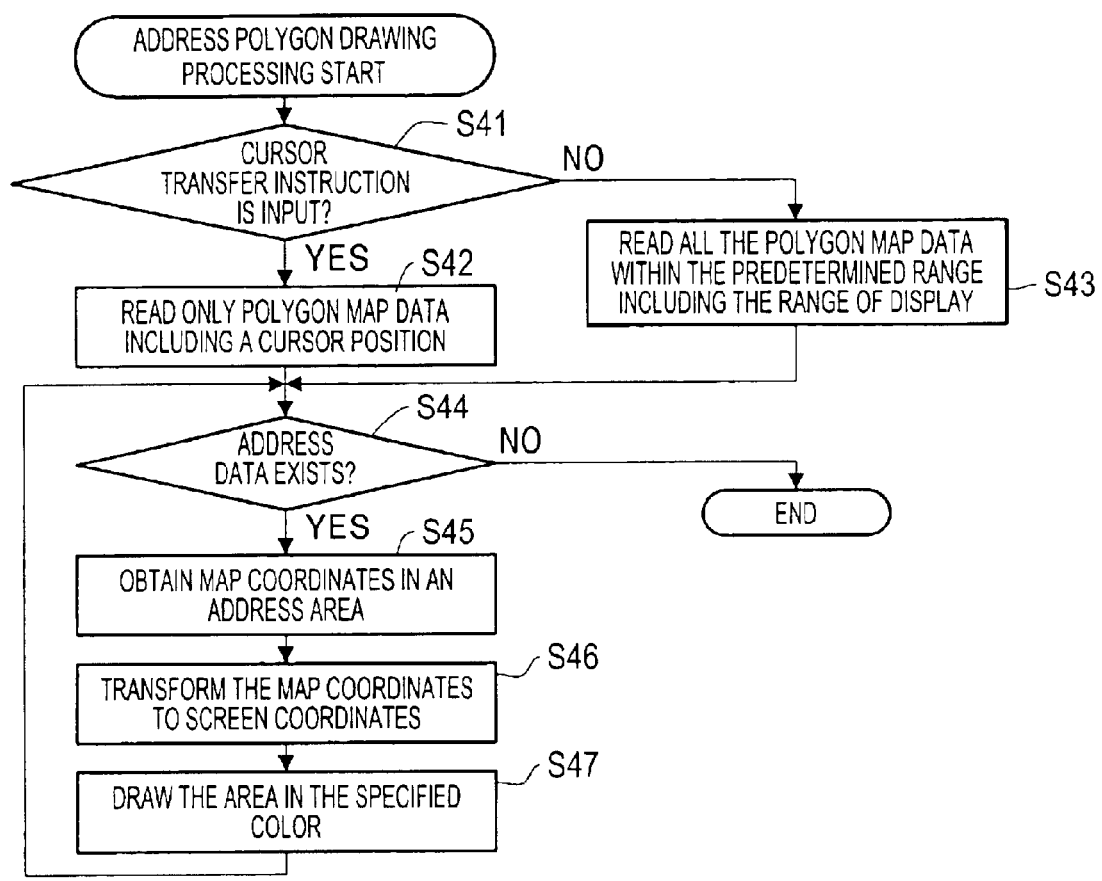
FIG. 18 is a flowchart describing an example of processing for drawing a map by using data of a polygon map including a cursor position when a cursor move instruction is input.

Further, when the central processing unit 4 detects that a cursor transfer instruction is input by the input device 1, drawing processing of a polygon map using only data of polygon, including the cursor position, may be executed instead of drawing processing using data of polygon maps within the predetermined range, including the range of display. This example is described with reference to FIG. 18, where it is judged whether the cursor move instruction is input S41. If it is judged that the cursor transfer instruction is input (S41:YES), only polygon map data including the cursor position is loaded S42. If it is judged that the cursor transfer instruction is not input (S41:NO), all the polygon map data within the predetermined range including the range of display is loaded S43. It is then judged whether address data is available S44. If map data is available (S44:YES), map coordinates (coordinate sequence) of the address area corresponding thereto are obtained S45, the map coordinates are transformed to screen coordinates S46, and the area is drawn in a drawing color specified from color codes by referring to a color table S47. The processing thereafter returns to S44. When address data is not available (S44:NO), the processing is completed.

Figure 19:
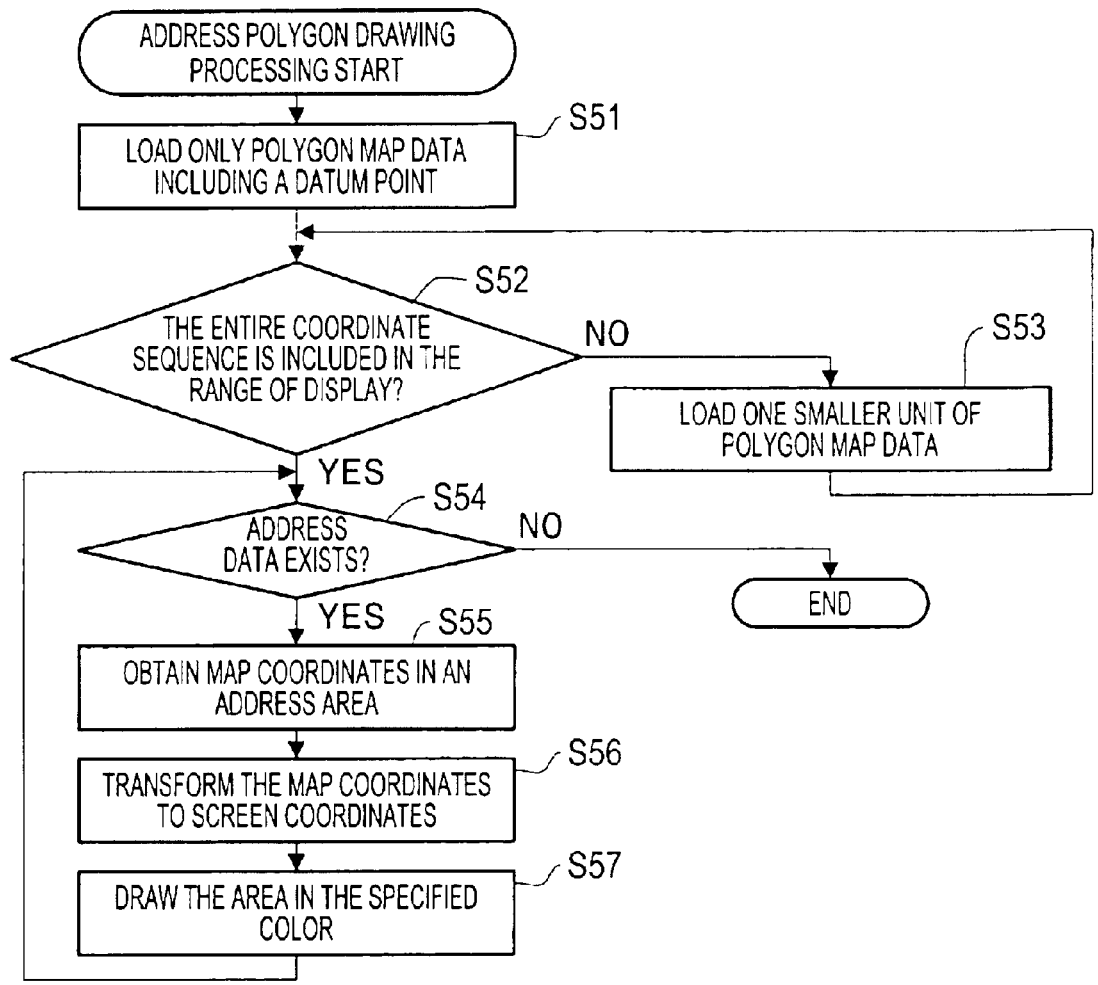
FIG. 19 is a flowchart describing an example of drawing processing for preventing the entire range of display from being included in one polygon map.

Further, in the above exemplary embodiment, a polygon unit is determined from the display scale input by applying polygon use tables (FIGS. 8 and 17) in which the display scales and polygon units correspond to each other. However, in this method, the entire range of display is likely to be included in one polygon. In that case, the entire display screen eventually becomes a unified display form. Therefore, an exemplary embodiment to avoid this problem will be described with reference to FIG. 19.

Only polygon map data including the datum point (a vehicle present position, a cursor present position, or a central position of the display screen) is first loaded S51. It is then judged whether the entire coordinate sequence of the loaded polygon data is included in the range of the display S52. If it is not included (S52:NO), the entire screen becomes a unified display form so that polygon map data for one smaller unit is loaded S53, and it is judged in the same manner whether the entire coordinate sequence of that polygon map data is included in the range of display. This processing is repeated until the entire coordinate sequence of the loaded polygon map data is included in the display range. After the entire coordinate sequence is included (S52:YES), it is then judged whether address data is available S54. If address data is available (S44:YES), map coordinates (coordinate sequence) in an address area corresponding thereto is obtained S55, the map coordinates are transformed to screen coordinates S56, and the area is drawn in a drawing color specified from a color code by referring to the color table S57. The processing thereafter returns to S54. When address data is not available (SS4:NO), the processing is completed.

According to the invention, a unit of polygon map to be displayed is determined, for example, on the basis of the display scale or by making one polygon unit included, so as to display a polygon map. Therefore, a point such as a vehicle position is easily recognized.

What is claimed is:

1. A map display device, comprising:

memory means for storing polygon map data;

drawing processing control means for drawing a polygon map by reading the polygon map data from the memory means; and display means for displaying an output from the drawing processing control means, wherein the drawing processing control means is equipped with a function for determining a unit of a polygon map that should be drawn and draws a polygon map of the determined unit to distinguish between a plurality of unit levels, wherein the polygon map data has only one unit of polygon data stored with larger polygon map data units drawn from the one unit of polygon data.

2. The map display device according to claim 1, wherein the drawing processing control means reads polygon map data within a predetermined range, including a range of display, from the memory means and display patterns of adjoining polygon maps which are drawn different from each other.

3. The map display device according to claim 1, wherein the drawing processing control means determines a vehicle present position or a cursor present position and only polygon map data, including the detected present position, is read from the memory means and drawn.

4. The map display device according to claim 1, further comprising input means for inputting a display scale, wherein the drawing processing control means determines a unit of a polygon map that should be drawn on the basis of the display scale input by the input means and draws a polygon map of the determined unit.

5. The map display device according to claim 4, wherein the drawing processing control means reads polygon map data within a predetermined range, including a range of display, from the memory means and display patterns of adjoining polygon maps which are drawn different from each other.

6. The map display device according to claim 4, wherein the drawing processing control means determines a vehicle present position or a cursor present position and only polygon map data, including the detected present position, is read from the memory means and drawn.

7. The map display device according to claim 1, wherein the drawing processing control means draws a polygon map that is included in a range of display and of a largest unit.

8. The map display device according to claim 7, wherein the drawing processing control means reads polygon map data within a predetermined range, including a range of display, from the memory means and display patterns of adjoining polygon maps which are drawn different from each other.

9. The map display device according to claim 7, wherein the drawing processing control means determines a vehicle present position or a cursor present position and only polygon map data, including the detected present position, is read from the memory means and drawn.

10. A computer readable memory medium, wherein the computer readable memory medium stores therein a polygon map database, and programs for determining a unit of a polygon map that should be drawn and drawing a polygon map of the determined unit to distinguish between a plurality of unit levels, wherein the polygon map database has only one unit of polygon data stored with larger polygon map data units drawn from the one unit of polygon data.

11. A method for displaying a map, comprising:

storing polygon map data; and displaying a polygon map by reading the stored polygon map data, determining a unit of a polygon map that should be displayed and displaying a polygon map of the determined unit to distinguish between a plurality of unit levels, wherein the polygon map data has only one unit of polygon data stored with larger polygon map data units drawn from the one unit of polygon data.

* * * * *